United States Patent
Jeon et al.

(10) Patent No.: US 10,061,149 B2
(45) Date of Patent: Aug. 28, 2018

(54) NANOCAPSULE LIQUID CRYSTAL DISPLAY DEVICE

(71) Applicant: LG DISPLAY CO., LTD., Seoul (KR)

(72) Inventors: Ji-Na Jeon, Paju-si (KR); Kyeong-Jin Kim, Goyang-si (KR); Min-Geon Choi, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 377 days.

(21) Appl. No.: 14/752,194

(22) Filed: Jun. 26, 2015

(65) Prior Publication Data
US 2016/0011443 A1    Jan. 14, 2016

(30) Foreign Application Priority Data

Jul. 9, 2014 (KR) .................. 10-2014-0085828

(51) Int. Cl.
*G02F 1/1333* (2006.01)
*G02F 1/1334* (2006.01)
*G02F 1/13363* (2006.01)
*G02F 1/139* (2006.01)

(52) U.S. Cl.
CPC .......... *G02F 1/1334* (2013.01); *G02F 1/1393* (2013.01); *G02F 1/133634* (2013.01); *G02F 2202/36* (2013.01)

(58) Field of Classification Search
CPC ............. G02F 1/1334; G02F 1/133528; G02F 1/13363; G02F 1/1368; G02F 1/136286; G02F 2001/133531; G02F 1/133634; G02F 1/1393; G02F 2202/36

USPC ......................................................... 349/88
See application file for complete search history.

(56) References Cited

U.S. PATENT DOCUMENTS

| | | | |
|---|---|---|---|
| 5,566,008 A * | 10/1996 | Yoshida | G02F 1/1334 349/153 |
| 2006/0158593 A1* | 7/2006 | Sakai | G02F 1/13363 349/122 |
| 2012/0113363 A1* | 5/2012 | Lim | G02F 1/1334 349/96 |

FOREIGN PATENT DOCUMENTS

| | | |
|---|---|---|
| CN | 1340729 A | 3/2002 |
| CN | 102402035 A | 4/2012 |
| CN | 102466912 A | 5/2012 |
| CN | 102466929 A | 5/2012 |
| KR | 10-2007-0066014 A | 6/2007 |
| KR | 10-2011-0095634 A | 8/2011 |
| KR | 10-2014-0017856 A | 2/2014 |

* cited by examiner

*Primary Examiner* — Charles Chang
(74) *Attorney, Agent, or Firm* — Dentons US LLP

(57) ABSTRACT

Disclosed is a nanocapsule liquid crystal display device. The display includes a liquid crystal panel having a substrate and a nanocapsule liquid crystal layer over the substrate; a first polarizing plate on an outer surface of the substrate and including a first polarizing layer; and a second polarizing plate directly on an outer surface of the nanocapsule liquid crystal layer and including a second polarizing layer and a phase difference layer, wherein a retardation of the nanocapsule liquid crystal layer is compensated by the phase difference layer.

20 Claims, 6 Drawing Sheets

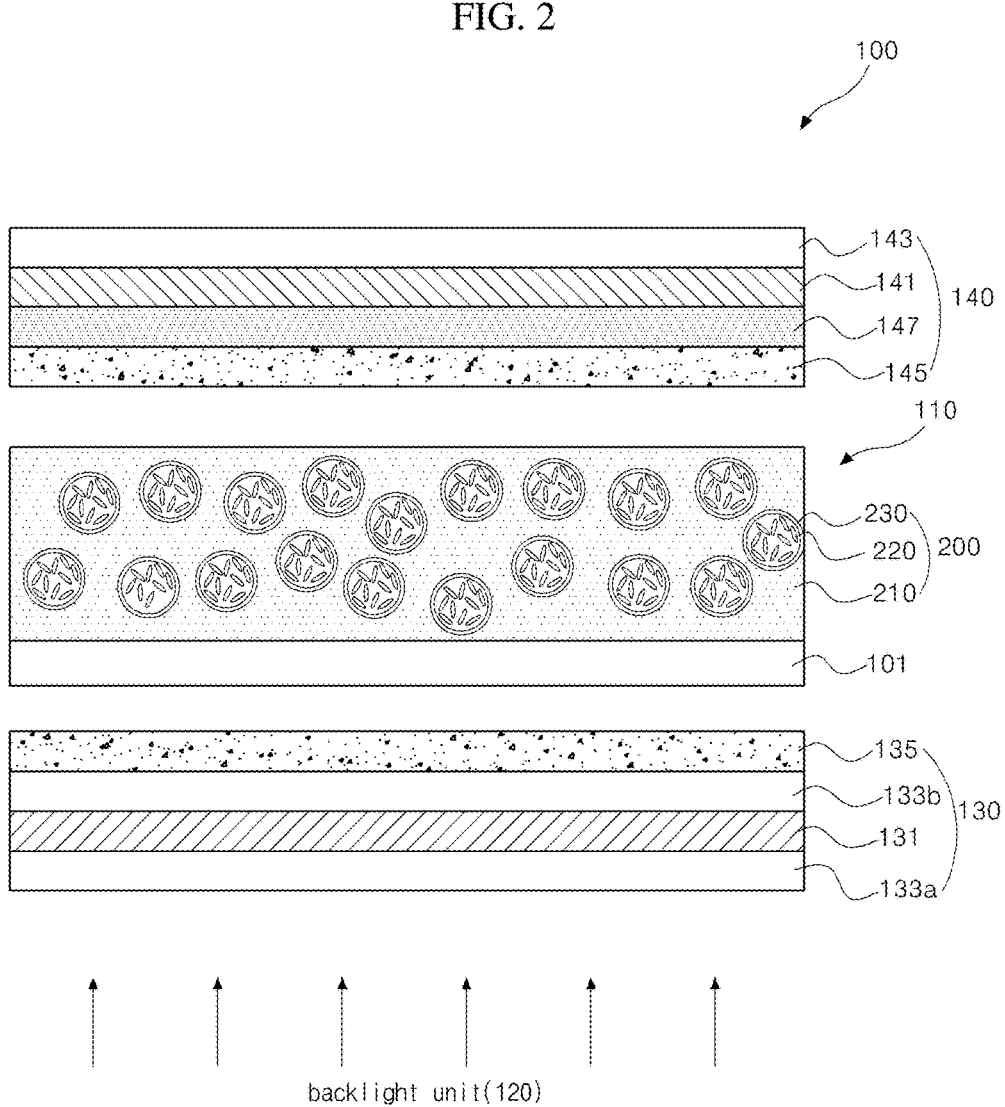

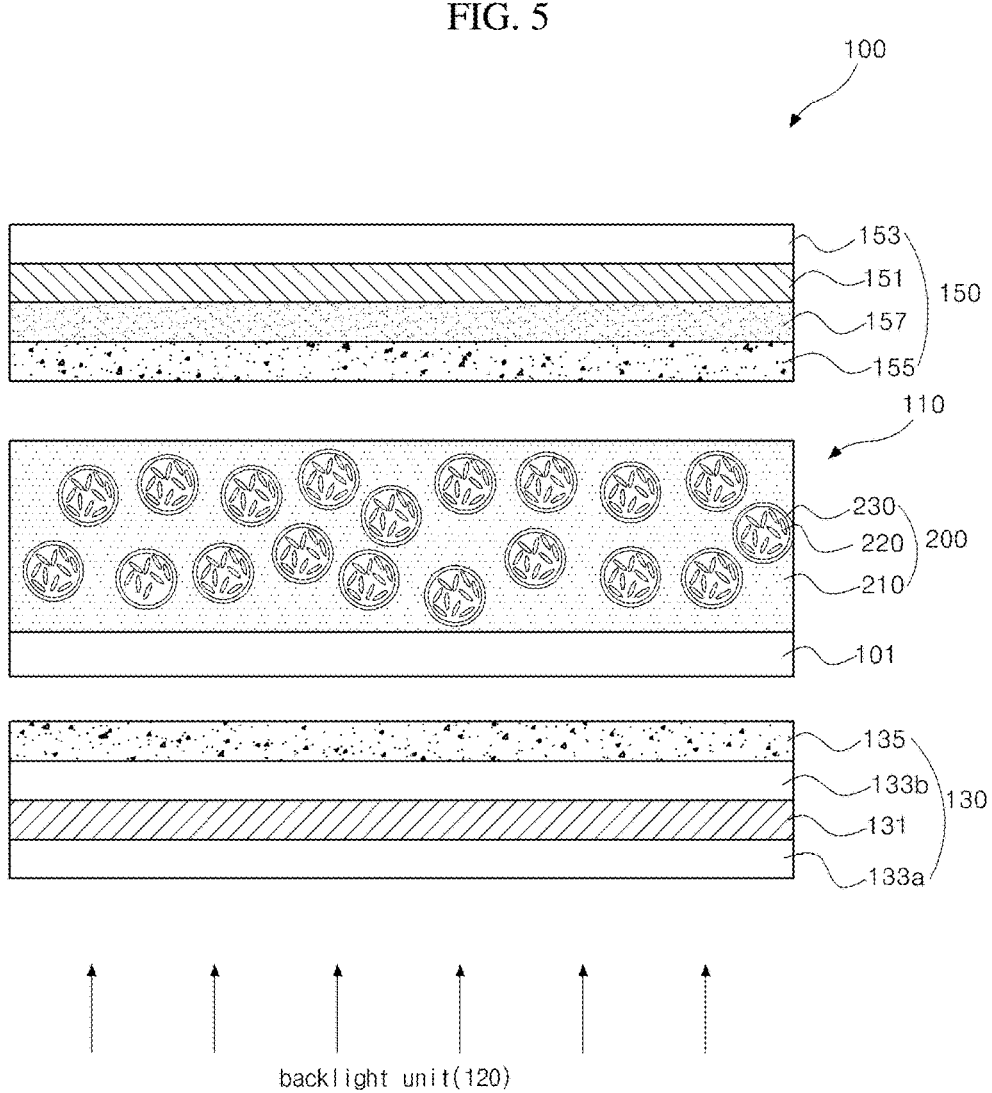

NANOCAPSULE LIQUID CRYSTAL DISPLAY DEVICE

This application claims the benefit of Korean Patent Application No. 10-2014-0085828 filed in Korea on Jul. 9, 2014, which is hereby incorporated by reference for all purposes as if fully set forth herein.

BACKGROUND OF THE INVENTION

Field of the Invention

The present invention relates to a liquid crystal display (LCD) device. More particularly, the present invention relates to an LCD device including a nanocapsule layer capable of preventing a light leakage problem.

Discussion of the Related Art

Liquid crystal display (LCD) devices, which are widely used for TV, monitors, and so on because of characteristics adequate to display moving images and their high contrast ratio, use optical anisotropy and polarization properties of liquid crystal molecules to display images.

The LCD device requires a liquid crystal panel including two substrates and a liquid crystal layer therebetween. The alignment direction of the liquid crystal molecules can be controlled by application of an electric field across the liquid crystal molecules.

Since the liquid crystal panel does not include a light source, the LCD device requires a backlight. The backlight is disposed under the liquid crystal panel and includes a light source.

FIG. 1 is a cross-sectional view illustrating an LCD device according to the related art.

Referring to FIG. 1, the LCD device includes a liquid crystal panel 10 including an array substrate, a color filter substrate and a liquid crystal layer 50 between the array substrate and the color filter substrate, and a backlight unit 60 below the liquid crystal panel 10. A first substrate 2 referred to as the array substrate includes a pixel region P, and on an inner surface of the first substrate 2, a thin film transistor T is in each pixel region P and connected to a pixel electrode P in each pixel region P.

On an inner surface of a second substrate 4 referred to as the color filter substrate, a black matrix 32 is formed in a lattice shape surrounding the pixel region P to cover a non-display element such as the thin film transistor T and expose the pixel electrode 28.

Red, green and blue color filters 34 are formed in the lattice shape corresponding to the respective pixel regions P, and a common electrode 36 is formed on the black matrix 32 and the color filters 34.

First and second polarizing plates 20 and 30 are attached to outer surfaces of the first and second substrates 2 and 4, respectively.

First and second alignment layers 31a and 31b are formed between both the pixel electrode 28 and the common electrode 36, and the liquid crystal layer 50. The first and second alignment layers 31a and 31b are rubbed and align liquid crystal molecules.

A seal pattern 70 is formed between and along peripheral regions of the first and second substrates 2 and 4 and prevents leakage of the liquid crystal.

The backlight unit 60 including the light source supplies light to the liquid crystal panel 10.

To provide the LCD device with improved response time, a new LCD device having a nanocapsule liquid crystal layer is introduced. The nanocapsule liquid crystal layer includes a plurality of nanocapsules, and nematic liquid crystal molecules, which are arranged randomly, are capsuled by each nanocapsule.

Since the nanocapsule liquid crystal layer does not have an initial alignment to be optically anisotropic, alignment of liquid crystal molecules may not be required. Thus, no alignment layer may be needed in the device, and also, processes for forming an alignment layer such as rubbing may not be needed.

In addition, since the nanocapsule liquid crystal layer is formed by a curing process, a second substrate 4 may be omitted when the color filter 34 and the common electrode 36 are formed on the first substrate 2.

Further, processes for forming a gap for a liquid crystal layer between the first and second substrates 2 and 4 may be omitted, and processes for forming a seal pattern for preventing leakages of the liquid crystal molecules may be omitted.

As a result, the process efficiency may be improved.

However, the nanocapsule in the nanocapsule LCD device is deformed such that light leakage at a black state may be generated.

In addition, at a side viewing angle, an angle between transmissive axes of the first and second polarizing plates 20 and 30 is above 90 degrees such that the light leakage may be generated.

As a result, the contrast ratio of the nanocapsule LCD device is decreased such that problems in the image quality and the visibility are generated.

SUMMARY OF THE INVENTION

Accordingly, the present invention is directed to a nanocapsule liquid crystal display (LCD) device that substantially obviates one or more of the problems due to limitations and disadvantages of the prior art.

An advantage of the present invention is to provide a nanocapsule LCD device that can prevent the light leakage problem.

An advantage of the present invention is to provide a nanocapsule LCD device that can improve the contrast ratio.

An advantage of the present invention is to provide a nanocapsule LCD device that can improve its response time and/or production efficiency.

An advantage of the present invention is to provide a nanocapsule LCD device having thin-profile and light weight.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described herein, a nanocapsule liquid crystal display device comprises a liquid crystal panel including a substrate and a nanocapsule liquid crystal layer over the substrate; a first polarizing plate on an outer surface of the substrate and including a first polarizing layer; and a second polarizing plate directly on an outer surface of the nanocapsule liquid crystal layer and including a second polarizing layer and a phase difference layer, wherein a retardation of the nanocapsule liquid crystal layer is compensated by the phase difference layer.

It is to be understood that both the foregoing general description and the following detailed description are exemplary and explanatory and are intended to provide further explanation of the invention as claimed.

BRIEF DESCRIPTION OF THE DRAWINGS

FIG. 2 is a cross-sectional view illustrating a nanocapsule LCD device according to a first embodiment of the present invention.

FIG. 5 is a cross-sectional view illustrating a nanocapsule LCD device according to a second embodiment of the present invention.

DETAILED DESCRIPTION OF THE ILLUSTRATED EMBODIMENTS

Reference will now be made in detail to exemplary embodiments, examples of which are illustrated in the accompanying drawings.

Figure 3A:
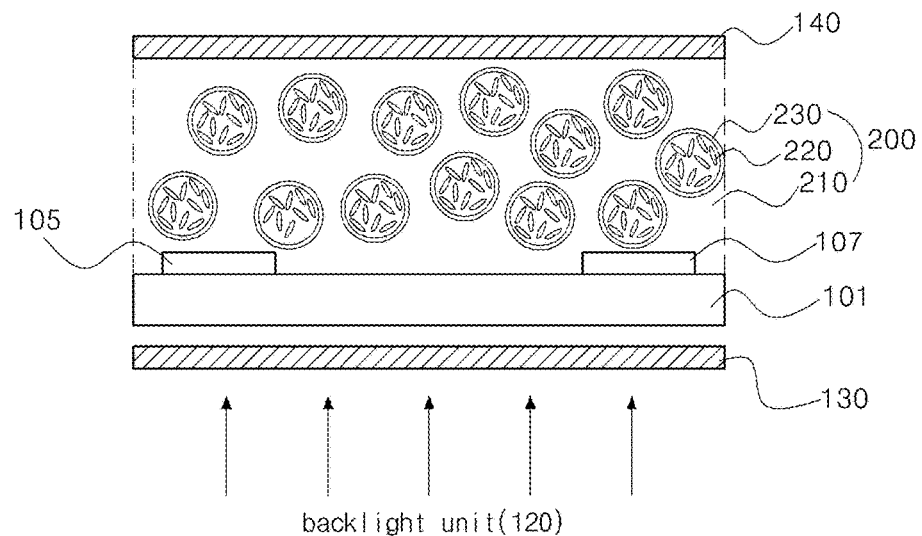
FIGS. 3A and 3B are schematic views illustrating an image display principle of a nanocapsule LCD device according to the first embodiment of the present invention.
Figure 3B:
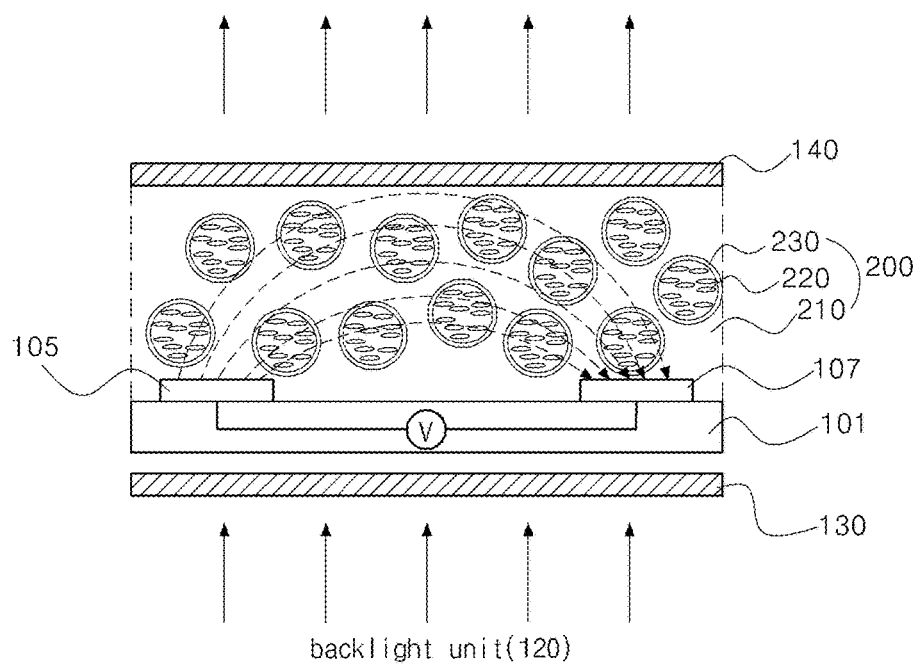

FIG. 2 is a cross-sectional view illustrating a nanocapsule LCD device according to a first embodiment of the present invention, and FIGS. 3A and 3B are schematic views illustrating an image display principle of a nanocapsule LCD device according to the first embodiment of the present invention.

Referring to FIGS. 2, 3A and 3B, a nanocapsule LCD device 100 includes a liquid crystal panel 110 and a backlight unit 120.

The liquid crystal panel 110 includes a substrate 101 and a nanocapsule liquid crystal layer.

The substrate 101 is referred to as a lower substrate or an array substrate. Although not shown, a gate line and a of data line cross each other on an inner surface of the substrate 101 to define a pixel region. A thin film transistor (TFT) is formed near the crossing portion of the gate and data lines, and a passivation layer is disposed on the TFT. A black matrix, which has a lattice shape surrounding the pixel region, and red, green and blue color filters, which are alternately arranged in the pixel region, are disposed on the passivation layer therebetween.

A pixel electrode 105, which is connected to the TFT, and a common electrode 107, which is spaced apart from the pixel electrode 105, are disposed on or over the color filters. The pixel and common electrodes 105 and 107 may be alternately arranged.

An electric field is induced between the pixel electrode 105 and the common electrode 107 and controls liquid crystal molecules 220 of the nanocapsule liquid crystal layer 200, and thus light transmittance is changed to display images.

The nanocapsule liquid crystal layer 200 includes a plurality of nanocapsules 230 and a buffer layer 210. The nanocapsules 230 are dispersed in the buffer layer 210, with each including a plurality of liquid crystal molecules 220 therein. In other words, the plurality of liquid crystal molecules 220 are capsuled by each nanocapsule 230 having a nanosize. The nanocapsule liquid crystal layer 200 changes light transmittance to display images.

The nanocapsule liquid crystal layer 200 is an optically isotropic type liquid crystal layer in a normal state. Accordingly, when no electric field is applied to the nanocapsule liquid crystal layer 200, the nanocapsule liquid crystal layer 200 is optically isotropic in two or three dimension. However, when an electric field induced between the pixel electrode 105 and the common electrode 107 is applied, the nanocapsule liquid crystal layer 200 has a birefringence property in a direction perpendicular or parallel to the applied electric field.

Namely, when the liquid crystal molecules 220 in the nanocapsule 230 are negative type nematic liquid crystal molecule having (−) dielectric anisotropy, the liquid crystal molecules 220 are arranged to be perpendicular to the electric field to have the birefringence property. On the other hand, when the liquid crystal molecules 220 in the nanocapsule 230 are positive type nematic liquid crystal molecule having (+) dielectric anisotropy, the liquid crystal molecules 220 are arranged to be parallel to the electric field to have the birefringence property.

Accordingly, when an electric field is applied, the nanocapsule liquid crystal layer 200 may have an optically uniaxial property.

The nanocapsule 230 may have about 5% to about 95% of a total volume of the nanocapsule liquid crystal layer 200, and preferably, may have about 25% to about 65% of the total volume of the nanocapsule liquid crystal layer 200. The buffer layer 210 occupies the rest of the total volume.

The buffer layer 210 may be made of a transparent or semi-transparent material and have water-solubility, fat-solubility, or mixture of water-solubility and fat-solubility. The buffer layer 210 may be heat cured or UV cured. The buffer layer 210 may have an additive to increase strength and reduce curing time.

A thickness, i.e., a cell gap, of the nanocapsule liquid crystal layer 200 including the nanocapsules 230 may be about 1 to about 10 micrometers, and preferably, may be about 2 to about 5 micrometers.

When the thickness, i.e., the cell gap, of the nanocapsule liquid crystal layer 200 is below 2 micrometers, the change of the light transmittance is not sufficient to display images. On the other hand, when the thickness, i.e., the cell gap, of the nanocapsule liquid crystal layer 200 is above 5 micrometers, the electric field between the pixel electrode 105 and the common electrode 107 may not be applied to an upper portion of the nanocapsule liquid crystal layer 200 such that the power consumption may be increased. In addition, since a total thickness of the liquid crystal panel 110 is increased, it is difficult to use the nanocapsule LCD device 100 for a flexible display device.

The nanocapsule 230 may have a diameter of about 1 nm to about 320 nm, and preferable, about 30 nm to about 100 nm.

Because the nanocapsule 230 has a diameter less than any wavelengths of visible light, there occurs substantially no optical change due to refractive index, and optically isotropic property can be obtained. Further, scattering of visible light can be minimized.

Particularly, when the nanocapsule 230 is formed with a diameter of about 100 nm or less, high contrast ratio can be obtained.

The nanocapsules 230 are dispersed in the buffer layer 210 of a liquid crystal material. Alternatively, the nanocapsules 230 are disposed in the film-shaped buffer layer 210 of polymer. The buffer layer 210 of the liquid crystal material may be formed using a printing method, a coating method or a dispensing method. The film-shaped buffer layer 210 of polymer with the nanocapsules 230 may be formed by a lamination process.

After the nanocapsule liquid crystal layer 200 is formed over the substrate 101, a curing process may be conducted to remove solvent in the buffer layer 210.

A first polarizing plate 130 and a second polarizing plate 140 are attached onto outer surfaces of the liquid crystal panel 110. In other words, the first polarizing plate 130 is on an outer surface of the substrate 101, and the second polarizing plate 140 is on an outer surface of the nanocapsule liquid crystal layer 200. Since the nanocapsule liquid crystal layer 200 is cured, the second polarization plate 140 can be attached to the nanocapsule liquid crystal layer 200 without a substrate. The first polarizing plate 130 has a first polarizing axis along a first direction, while the second polarizing plate 140 has a second polarizing axis along a second direction perpendicular to the first direction.

The second polarizing plate 140, which is directly attached on the outer surface of the nanocapsule liquid crystal layer 200, includes a phase difference layer 147. In the phase difference layer 147, the refractive index "nx" of a first horizontal axis may be equal to the refractive index "ny" of a second horizontal axis, and the refractive index "nz" of a vertical axis may be larger than the refractive indexes "nx" and "ny". (nz>nx=ny)

The backlight unit 120 is located below the liquid crystal panel 110 to supply light to the liquid crystal panel 110. Alternatively, the backlight unit 120 can be omitted in a reflective type LCD device.

The backlight unit 120 is categorized into a sidelight type and a direct type. The sidelight type backlight unit 120 includes a light source (not shown) on at least one side of a light guide panel (not shown) below the liquid crystal panel 110. The direct type backlight unit 120 includes at least one light source below the liquid crystal panel 110. The backlight unit 120 in the present invention is the sidelight type or the direction type.

A cold cathode fluorescent lamp (CCFL), an external electrode fluorescent lamp (EEFL), or a light emitting diode (LED) may be used as a light source of the backlight unit 120.

Referring to FIG. 3A, in the off state of the nanocapsule LCD device 100, the liquid crystal molecules 220 in the nanocapsule 230 are arranged randomly. Since the liquid crystal molecule 220 and the nanocapsule 230 have a difference in a refractive anisotropy, the nanocapsule liquid crystal layer 200 is optically isotropic.

Accordingly, the light, which is emitted from the backlight unit 120, passing through the first polarizing plate 130 passes the nanocapsule liquid crystal layer 200 without optical change and is blocked by the second polarizing plate 140, which has a polarization axis perpendicular to that of the first polarizing plate 130, such that the nanocapsule LCD device 100 has a black state.

Referring to FIG. 3B, a horizontal electric field is generated between the pixel electrode 105 and the common electrode 107, the liquid crystal molecules 220 in the nanocapsule 230 are regularly arranged along the electric field such that an optical property of the light passing the nanocapsule liquid crystal layer 200 is changed. The light passing the nanocapsule liquid crystal layer 200 passes the second polarizing plate 140 such that the nanocapsule LCD device 100 has a white state.

In this case, it is preferred that a difference between the refractive index of the nanocapsule 230 and the refractive index of the liquid crystal molecules 220 is within about ±0.1. The average refractive index (n) of the liquid crystal molecules 220 may be defined as follows: $n=[(ne+2*no)/3]$ (where ne is a refractive index of a major axis of the liquid crystal molecules 220, and no is a refractive index of a minor axis of the liquid crystal molecules 220).

Accordingly, the nanocapsule LCD device 100 including the nanocapsule liquid crystal layer 200 can be used as a display device, with its transmittance changing according to a variation of the voltage applied.

Since the nanocapsule liquid crystal layer 200 does not have an initial alignment to be optically anisotropic, alignment of liquid crystal molecules may not be required, and thus no alignment layer may be needed in the nanocapsule LCD device 100, and also, processes for forming an alignment layer such as rubbing may not be needed. Namely, the nanocapsule liquid crystal layer 200 may directly contact the pixel and common electrodes 105 and 107 without the alignment layer.

Figure 1:
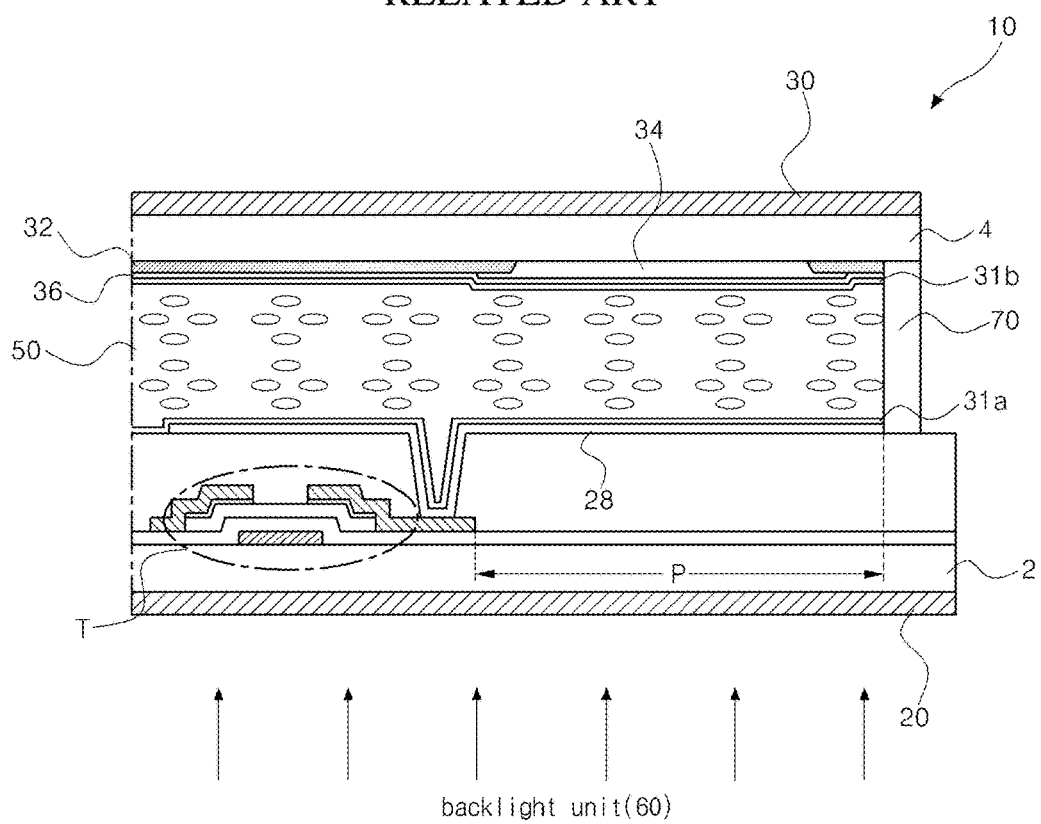
FIG. 1 is a cross-sectional view illustrating an LCD device according to the related art.

In addition, since the nanocapsule liquid crystal layer 200 is cured, the second substrate 4 (of FIG. 1) can be omitted. Since the liquid crystal panel 110 has a thin profile without the second substrate 4, the nanocapsule LCD device 100 has advantages in the thickness and weight and can be used as a flexible display device.

Moreover, processes for forming a gap for a liquid crystal layer between the first and second substrates may be omitted, and processes for forming a seal pattern for preventing leakages of the liquid crystal molecules may be omitted.

As a result, the process efficiency may be improved.

Further, when an external force is applied to the nanocapsule LCD device 100, the light leakage by the external force is not generated because the liquid crystal molecules 220 are disposed inside the nanocapsule 230 and have a size smaller than the wavelength of the visible light. Accordingly, when the nanocapsule LCD device 100 as a flexible display device is bended or folded, there is no light leakage.

Since the second polarizing plate 140, which may be directly attached on the outer surface of the nanocapsule liquid crystal layer 200, includes the phase difference layer 147 meeting the refractive indexes relation, i.e., nz>nx=ny, the light leakage problem caused by the deformation of the nanocapsule 230 is prevented. As a result, the contrast ratio is increased, and the image quality is improved.

The first polarizing plate 130, which is attached on the outer surface of the liquid crystal panel 110, includes a first polarizing layer 131 having a polarization axis along a first direction and first and second base films 133a and 133b. The first polarizing layer 131 is disposed between the first and second base films 133a and 133b. The first polarizing layer 131 is protected and supported by the first and second base films 133a and 133b.

The first polarizing plate 130 is attached on the outer surface of the substrate 101 by a first adhesive layer 135 at an outer surface of the second base film 133b.

The second polarizing plate 140 includes a second polarizing layer 141 having a polarization axis along a second direction, which is perpendicular to the first direction, a third base film 143 and the phase difference layer 147. The second polarizing layer 141 is disposed between the third base film 143 and the phase difference layer 147. The second polarizing layer 141 protected and supported by the third base film 143 and the phase difference layer 147.

The second polarizing plate 140 is attached on the outer surface of the nanocapsule liquid crystal layer 200 by a second adhesive layer 145 at an outer surface of the phase difference layer 147.

Each of the first and second polarizing plates 130 and 140 transmits a linearly-polarized light along a pre-determined direction. Each of the first and second polarizing plates 130 and 140 may be fabricated by stretching polyvinylalcohol (PVA) film, which absorbs iodine as a polarizer.

Each of the first to third base films 133a, 133b and 143 may be formed of one of triacetyl cellulose, polyethylene terephthalate polymer, polyethylene naphthalate polymer, polyester polymer, polyethylene polymer, polypropylene polymer, polyvinylidene chloride polymer, polyvinyl alcohol polymer, polyethylene vinyl alcohol polymer, polystyrene polymer, polycarbonate polymer, norbornene polymer, poly methyl pentene polymer, polyether ketone polymer, polyether sulfone polymer, polysulfone polymer, polyether ketone imide polymer, polyamide polymer, polymethacrylate polymer, polyacrylate polymer, polyarylate polymer and fluoropolymer polymer.

A residual phase delay of the first and second polarizing plates 130 and 140 may be partially compensated by the first to third base films 133a, 133b and 143.

Each of the first to third base films 133a, 133b and 143 may have an in-plane retardation value (Re) within about 2 to about 5 nm and a thickness retardation value (Rth) within about −75 to −80 nm. Alternatively, each of the first to third base films 133a, 133b and 143 may be a zero-retardation film with no retardation value.

The phase difference layer 147 in the second polarizing plate 140 meets a relation of "nz>nx=ny" and may be a positive C plate. The phase difference generated by the nanocapsule liquid crystal layer 200 may be completely compensated by the phase difference layer 147 and the first to third base films 133a, 133b and 143.

A thickness retardation value (Rth) of the phase difference layer 147 may be defined as follows: Rth=d*(nz−ny) (where "d" is a thickness of the phase difference layer 147, "nz" is a refractive index of the phase difference layer 147 in a thickness, i.e., vertical, direction, and "ny" is a refractive index of the phase difference layer 147 in a horizontal direction).

An in-plane retardation value of the phase difference layer 147 may be about zero, and the thickness retardation value of the phase difference layer 147 may be positive. Accordingly, the phase difference layer 147 as the positive C plate has a light path along the thickness direction, i.e., the z-direction, and has the thickness retardation value of about 80 to about 120 nm or about 5 to about 40 nm in a wavelength of about 550 nm.

In the nanocapsule LCD device 100 of the present invention, the light path is refracted toward the x-direction and the z-direction by the phase difference layer 147 as the positive C plate such that the light leakage is prevented and the contrast ratio is improved.

Namely, when the nanocapsule liquid crystal layer 200 is formed by removing the solvent with the curing process, the nanocapsule liquid crystal layer 200 is contracted such that the nanocapsule 230 in the nanocapsule liquid crystal layer 200 is also contracted in normal direction, i.e., the z-direction. Namely, since the nanocapsule liquid crystal layer 200 is formed by a curing process, a vertical diameter of the nanocapsule 230 is smaller than a horizontal diameter of the nanocapsule 230. As a result, in the nanocapsule 230, the refractive index in the z-direction becomes to be smaller than the refractive indexes in the x-direction and the y-direction.

Accordingly, the nanocapsule liquid crystal layer 200 may have a property of a negative C plate meeting a relation of "nx=ny>nz".

Since the nanocapsule liquid crystal layer 200 has a thickness of about 1 to about 10 micrometers, a thickness retardation value of the nanocapsule liquid crystal layer as the negative C plate may be within −40 to −5 nm.

In the nanocapsule LCD device 100 according to the first embodiment of the present invention, by providing the phase difference layer 147 as the positive C plate, which has a relation of "nz>nx=ny", on the second polarizing plate 140, the phase difference generated by the nanocapsule liquid crystal layer 200 is compensated.

For example, when the second base film 133b of the first polarizing plate 130 is a zero-retardation film having no retardation value, the thickness retardation value of the phase difference layer 147 may be about 5 to about 40 nm. Namely, a summation of thickness retardation values of the nanocapsule layer 200 and the phase difference layer 147 is zero. When the second base film 133b of the first polarizing plate 130 has a non-zero retardation value, e.g., with a thickness retardation about −75 to about −80 nm, the thickness retardation value of the phase difference layer 147 may be about 80 to about 120 nm. Namely, a summation of thickness retardation values of the nanocapsule layer 200, the second base film 133b and the phase difference layer 147 is zero.

Accordingly, the light leakage generated by the deformation of the nanocapsule 230 in the nanocapsule liquid crystal layer 200 is prevented, and the contrast ratio is improved such that the image quality and the visibility are also improved.

Figure 4A:
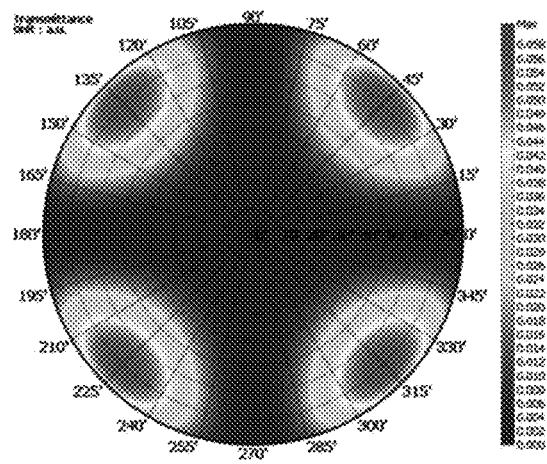
FIG. 4A is a simulation result of a contrast ratio at a black state in a nanocapsule LCD device according to the related art.
Figure 4B:
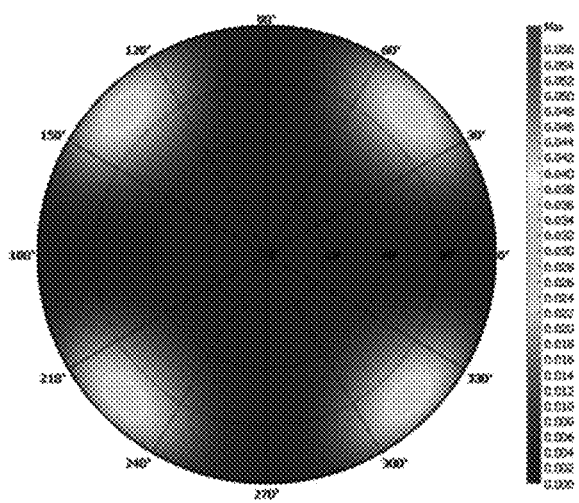
FIG. 4B is a simulation result of a contrast ratio at a black state in a nanocapsule LCD device according to the first embodiment of the present invention.

FIG. 4A is a simulation result of a contrast ratio at a black state in a nanocapsule LCD device according to the related art, and FIG. 4B is a simulation result of a contrast ratio at a black state in a nanocapsule LCD device according to the first embodiment of the present invention.

Referring to FIG. 4A, in the nanocapsule LCD device without the phase difference layer 147, the light leakage is strongly generated at four corners, i.e., diagonal directions of 45, 135, 225 and 315 degrees, in the black state. As a result, the contrast ratio is decreased, and the image quality and the visibility are degraded.

However, referring to FIG. 4B, in the nanocapsule LCD device with the phase difference layer 147 according to the present invention, the light leakage problem is reduced and minimized.

The light leakage may be verified from the brightness measured at a corner. In the black state of the nanocapsule LCD device without the phase difference layer 147, the brightness is measured to be 0.0500 as the light leakage. However, in the black state of the nanocapsule LCD device with the phase difference layer 147, the brightness is measured to be 0.0194 and the light leakage is remarkably decreased. As a result, in the nanocapsule LCD device 100 according to the present invention, the contrast ratio is increased, and the image quality and the visibility are improved.

As described above, in the nanocapsule LCD device 100 according to the first embodiment of the present invention, since the retardation generated by the deformation of the nanocapsule 230 can be compensated by the phase difference layer 147 on the second polarizing plate 140, the light leakage in the black state can be prevented or minimized. Accordingly, the contrast ratio is increased, and the image quality and the visibility are improved.

FIG. 5 is a cross-sectional view illustrating a nanocapsule LCD device according to a second embodiment of the present invention. The same reference numbers may be used throughout the drawings to refer to the same or like parts.

Referring to FIG. 5, a nanocapsule LCD device 100 includes a liquid crystal panel 110 and a backlight unit 120. The liquid crystal panel 110 includes a substrate 101, where a TFT, a color filter layer and so on are formed, and a nanocapsule liquid crystal layer 200 over the substrate 101.

On the substrate 101, a pixel electrode 105 (of FIG. 3B) and a common electrode 107 (of FIG. 3B) are further formed.

The nanocapsule liquid crystal layer 200 includes a plurality of nanocapsules 230 and a buffer layer 210. The nanocapsules 230 are dispersed in the buffer layer 210. The nanocapsule liquid crystal layer 200 changes light transmittance to display images.

A first polarizing plate 130 and a second polarizing plate 150 are attached onto outer surfaces of the liquid crystal panel 110. In other words, the first polarizing plate 130 is on an outer surface of the substrate 101, and the second polarizing plate 150 is on an outer surface of the nanocapsule liquid crystal layer 200. Since the nanocapsule liquid crystal layer 200 is cured, the second polarization plate 150 can be attached to the nanocapsule liquid crystal layer 200 without a substrate. The first polarizing plate 130 has a first polarizing axis along a first direction and is directly attached onto the outer surface of the substrate 101. The second polarizing plate 150 has a second polarizing axis along a second direction perpendicular to the first direction and is directly attached onto the outer surface of the nanocapsule liquid crystal layer 200.

The second polarizing plate 150, which is directly attached on the outer surface of the nanocapsule liquid crystal layer 200, includes a phase difference layer 157. In the phase difference layer 157, the refractive index "nx" of a first horizontal axis may be smaller than the refractive index "nz" of a vertical axis and larger than the refractive index "ny" of a second horizontal axis. (nz>nx>ny)

The backlight unit 120 is located below the liquid crystal panel 110 to supply light to the liquid crystal panel 110. Alternatively, the backlight unit 120 can be omitted in a reflective type LCD device.

Since the nanocapsule liquid crystal layer 200 does not have an initial alignment to be optically anisotropic, alignment of liquid crystal molecules may not be required, and thus no alignment layer may be needed in the nanocapsule LCD device 100, and also, processes for forming an alignment layer such as rubbing may not be needed.

In addition, since the nanocapsule liquid crystal layer 200 is cured, the second substrate 4 (of FIG. 1) can be omitted. Since the liquid crystal panel 110 has thin profile without the second substrate 4, the nanocapsule LCD device 100 has advantages in the thickness and weight and can be used as a flexible display device.

Moreover, processes for forming a gap for a liquid crystal layer between the first and second substrates may be omitted, and processes for forming a seal pattern for preventing leakages of the liquid crystal molecules may be omitted.

As a result, the process efficiency may be improved.

Further, when an external force is applied to the nanocapsule LCD device 100, the light leakage by the external force is not generated because the liquid crystal molecules 220 are disposed inside the nanocapsule 230 and have a size smaller than the wavelength of the visible light. Accordingly, when the nanocapsule LCD device 100 as a flexible display device is bent or folded, there is no light leakage.

Since the second polarizing plate 150, which may be directly attached on the outer surface of the nanocapsule liquid crystal layer 200, includes the phase difference layer 157 meeting the refractive indexes relation, i.e., nz>nx>ny, a light leakage problem caused by the deformation of the nanocapsule 230 and non-perpendicularity of the polarization axes of the first and second polarizing plates 130 and 150 is prevented. As a result, the contrast ratio is increased, and the image quality is improved.

The first polarizing plate 130, which is attached on the outer surface of the liquid crystal panel 110, includes a first polarizing layer 131 having a polarization axis along a first direction and first and second base films 133a and 133b. The first polarizing layer 131 is disposed between the first and second base films 133a and 133b. The first polarizing layer 131 is protected and supported by the first and second base films 133a and 133b.

The first polarizing plate 130 is attached on the outer surface of the substrate 101 by a first adhesive layer 135 at an outer surface of the second base film 133b.

The second polarizing plate 150 includes a second polarizing layer 151 having a polarization axis along a second direction, which is perpendicular to the first direction, a third base film 153 and the phase difference layer 157. The second polarizing layer 151 is disposed between the third base film 153 and the phase difference layer 157. The second polarizing layer 151 protected and supported by the third base film 153 and the phase difference layer 157.

The second polarizing plate 150 is attached on the outer surface of the nanocapsule liquid crystal layer 200 by a second adhesive layer 155 at an outer surface of the phase difference layer 157.

A residual phase delay of the first and second polarizing plates 130 and 150 may be partially compensated by the first to third base films 133a, 133b and 153.

Each of the first to third base films 133a, 133b and 153 may have an in-plane retardation value (Re) within about 2 to about 5 nm and a thickness retardation value (Rth) within about −75 to −80 nm.

The phase difference layer 157 in the second polarizing plate 150 meets a relation of "nz>nx>ny" and may be a positive biaxial film. The phase difference generated by the nanocapsule liquid crystal layer 200 and non-perpendicularity of the polarization axes at a side viewing angle may be completely compensated by the phase difference layer 157.

The phase difference layer 157 as the positive biaxial film has both an in-plane retardation value (Rin) and a thickness retardation value (Rth). The in-plane retardation value (Rin) may be defined as "Rin=d*(nx−ny)", and the thickness retardation value (Rth) may be defined as "Rth=d*((nz+ny)/2−nz)" (where "d" is a thickness of the phase difference layer 157).

The phase difference layer 157 as the positive biaxial film has the in-plane retardation value of about 80 to about 120 nm or about 5 to about 40 nm in a wavelength of about 550 nm and the thickness retardation value of about 80 to about 120 nm or about 5 to about 40 nm in a wavelength of about 550 nm.

The polarization state or property of the light is controlled by the phase difference layer 157 as the positive biaxial film such that the light leakage is prevented and the contrast ratio is increased.

Namely, when the nanocapsule liquid crystal layer 200 is formed by removing the solvent with the curing process, the nanocapsule liquid crystal layer 200 is contracted such that the nanocapsule 230 in the nanocapsule liquid crystal layer 200 is also contracted in a normal direction, i.e., the z-direction. As a result, in the nanocapsule 230, the refractive index in the z-direction becomes to be smaller than the refractive indexes in the x-direction and the y-direction.

Accordingly, the nanocapsule liquid crystal layer 200 may have a property of a negative C plate meeting a relation of "nx=ny>nz".

Since the nanocapsule liquid crystal layer 200 has a thickness of about 1 to about 10 micrometers, a thickness retardation value of the nanocapsule liquid crystal layer as the negative C plate may be within −40 to −5 nm.

In the nanocapsule LCD device 100 according to the first embodiment of the present invention, by providing the phase difference layer 157 as the positive biaxial film, which has a relation of "nz>nx>ny", in the second polarizing plate 150, the phase difference generated by the nanocapsule liquid crystal layer 200 is compensated.

For example, when the second base film 133b of the first polarizing plate 130 is a zero-retardation film having no retardation value, the phase difference layer 157 may have the in-plane retardation value within about 5 to about 40 nm and the thickness retardation value within about 5 to about 40 nm.

When the second base film 133b of the first polarizing plate 130 has a non-zero retardation value, e.g., with an in-plane retardation value within about 2 to 5 nm and a thickness retardation value within about −75 to −80 nm, the phase difference layer 157 may have the in-plane retardation value within about 80 to about 120 nm and the thickness retardation value within about 80 to about 120 nm.

Accordingly, the light leakage generated by the deformation of the nanocapsule 230 in the nanocapsule liquid crystal layer 200 and non-perpendicularity of the polarization axes is prevented, and the contrast ratio is improved such that the image quality and the visibility are also improved.

Figure 6:
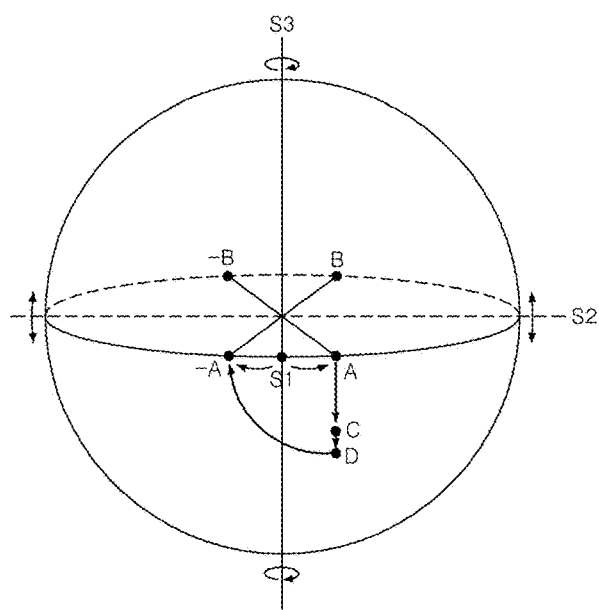
FIG. 6 is a Poincare sphere illustrating a polarization state of light passing through optical element of a nanocapsule LCD device according to the second embodiment of the present invention.

FIG. 6 is a Poincare sphere illustrating a polarization state of light passing through optical element of a nanocapsule LCD device according to the second embodiment of the present invention.

The Poincare sphere represents polarization states of light on a spherical surface. The Poincare sphere is widely used for designing compensation films because polarization states are easily predicted by using the Poincare sphere if optical axes and phase retardation values of the optical elements are known.

In the Poincare sphere, the equator designates the linear polarization, the polar point "S3" designates the left handed circular polarization, the polar point "−S3" designates the right handed circular polarization, the upper hemisphere designates the left handed elliptical polarization, and the lower hemisphere designates right handed elliptical polarization.

In FIG. 6, when the nanocapsule LCD device 100 (of FIG. 5) of the present invention is observed from the front, the point "S1" on the equator designates a polarization state of the first polarizing plate 130 (of FIG. 5), and the point "−S1" designates a polarization state of the second polarizing plate 150 (of FIG. 5).

The polarization states of the first and second polarizing plates 130 and 150 are symmetrical with respect to the center of the Poincare sphere. Thus, the polarization states of the first and second polarizing plates 130 and 150 are perpendicular to each other, to thereby generate the perfect black state.

On the other hand, when the nanocapsule LCD device 100 is observed from the side, the transmissive axis of the second polarizing plate 150 and the transmissive axis of the first polarizing plate 130 moves toward the point "S2", and the absorption axis of the second polarizing plate 150 and the absorption axis of the first polarizing plate 130 moves toward the point "−S2".

As a result, the absorption axis of the first polarizing plate 130 and the absorption axis of the second polarizing plate 150 are not symmetrical with respect to the center, so that the polarization states of the first and second polarizing plates are not perpendicular to each other. Since the first and second polarizing plates have non-perpendicularity, there is a light leakage problem.

In addition, since the nanocapsule liquid crystal layer 200 (of FIG. 5) has the property of the negative C plate due to the deformation of the nanocapsule 230 (of FIG. 5), the light leakage problem is further generated.

However, the light leakage problem can be prevented by providing the phase difference layer 157 (of FIG. 5), which has a relation of refractive indexes, i.e., nz>nx>ny, in the second polarizing plate 150 on the nanocapsule liquid crystal layer 200.

Namely, the light passing through the first polarizing layer 131 (of FIG. 5) has a polarization state of the point "A", and the light passing through the second base film 133b (of FIG. 5), which has a retardation value, has a polarization state of the point "C".

The light passing through the nanocapsule liquid crystal layer 200 has a polarization state of the point "D" by the retardation value of the nanocapsule liquid crystal layer 200. The light passes through the phase difference layer 157 as the positive biaxial film, which has a relation of refractive indexes, i.e., nz>nx>ny, to have a polarization state of the point "−A".

Since the polarization state of the light passing through the difference layer 157 is parallel to the absorption axis of the second polarizing layer 151 (of FIG. 5), the light is blocked by the second polarizing layer 151. As a result, the nanocapsule LCD device 100 generates the perfect black state in the side.

Figure 7:
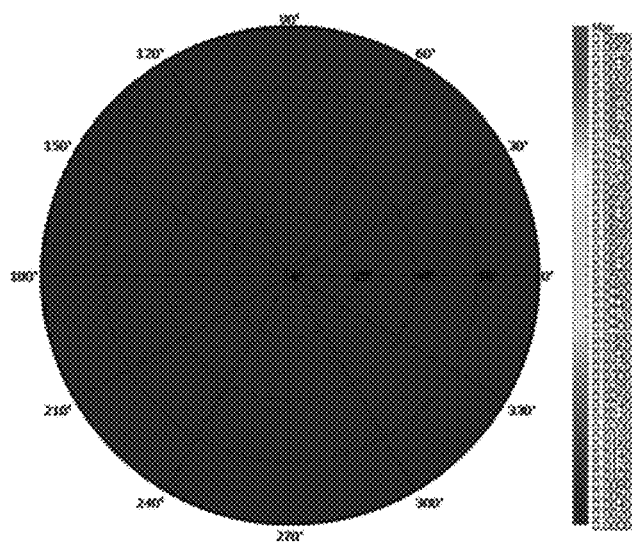
FIG. 7 is a simulation result of a contrast ratio at a black state in a nanocapsule LCD device including a second polarizing plate with a phase difference layer according to the second embodiment of the present invention.

FIG. 7 is a simulation result of a contrast ratio at a black state in a nanocapsule LCD including a second polarizing plate with a phase difference layer according to the second embodiment of the present invention.

Referring to FIG. 4A, in the black state, there is the light leakage in the four corners of the nanocapsule LCD device with higher brightness. Namely, the contrast ratio of the nanocapsule LCD device is decreased such that there are problems in the image quality and the visibility.

However, referring to FIG. 7, in the black state, there is no light leakage in the four corners of the nanocapsule LCD device 100 (of FIG. 5) with the phase difference layer 157 (of FIG. 5).

The light leakage may be verified from the brightness measured at a corner. In the black state of the nanocapsule LCD device without the phase difference layer, the brightness is measured to be 0.0500 as the light leakage. However, in the black state of the nanocapsule LCD device with the phase difference layer 157, the brightness is measured to be 0.0004 and the light leakage is minimized.

As a result, in the nanocapsule LCD device 100 according to the present invention, the contrast ratio is increased, and the image quality and the visibility are improved.

As described above, in the nanocapsule LCD device 100 according to the second embodiment of the present invention, since the retardation generated by the deformation of the nanocapsule 230 and the non-perpendicularity of the transmissive axes or the absorption axes of the first and second polarizing plates 130 and 150 can be compensated by the phase difference layer 157 in the second polarizing plate 140, the light leakage in the black state can be prevented or minimized. Accordingly, the contrast ratio is increased, and the image quality and the visibility are improved.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A nanocapsule liquid crystal display device, comprising:
    a liquid crystal panel including a substrate and a nanocapsule liquid crystal layer over the substrate;
    a first polarizing plate on an outer surface of the substrate and including a first polarizing layer; and
    a second polarizing plate directly on an outer surface of the nanocapsule liquid crystal layer and including a second polarizing layer and a phase difference layer,
    wherein a retardation of the nanocapsule liquid crystal layer is compensated by the phase difference layer, and
    wherein a pixel electrode and a common electrode are formed between the substrate and the nanocapsule liquid crystal layer, and the nanocapsule liquid crystal layer is driven by an electric field between the pixel and common electrodes.

2. The device of claim 1, wherein a summation of thickness retardation values of the nanocapsule layer and the phase difference layer is zero.

3. The device of claim 2, wherein the nanocapsule liquid crystal layer has thickness of about 1 to about 10 micrometers and a negative C property, and a thickness retardation value of the nanocapsule layer is within about −40 to about −5 nm.

4. The device of claim 3, wherein the phase difference layer has a positive C property.

5. The device of claim 4, wherein the first polarizing plate further includes a base film disposed between the first polarizing layer and the substrate and being a zero retardation film, and wherein a thickness retardation value of the phase difference layer is within about 5 to about 40 nm.

6. The device of claim 4, wherein the first polarizing plate further includes a base film disposed between the first polarizing layer and the substrate and being a non-zero retardation film with a thickness retardation value within about −75 to about −80 nm, and wherein a thickness retardation value of the phase difference layer is within about 80 to about 120 nm.

7. The device of claim 3, wherein the phase difference layer has a positive biaxial property.

8. The device of claim 7, wherein the first polarizing plate further includes a base film disposed between the first polarizing layer and the substrate and being a zero retardation film, and wherein the phase difference layer has an in-plane retardation value within about 5 to about 40 nm and a thickness retardation value within about 5 to about 40 nm.

9. The device of claim 7, wherein the first polarizing plate further includes a base film disposed between the first polarizing layer and the substrate and being a non-zero retardation film with a thickness retardation value within about −75 to about −80 nm, and wherein the phase difference layer has an in-plane retardation value within about 80 to about 120 nm and a thickness retardation value within about 80 to about 120 nm.

10. The device of claim 1, wherein a transmissive axis of the first polarizing plate is perpendicular to a transmissive axis of the second polarizing plate.

11. The device of claim 1, wherein the first polarizing plate further includes a first base film under the first polarizing layer, a second base film between the first polarizing layer and the substrate and an adhesive layer between the second base film and the substrate.

12. The device of claim 1, wherein the second polarizing plate further includes an adhesive layer between the phase difference layer and the nanocapsule liquid crystal layer, and the second polarizing plate is directly attached on the nanocapsule liquid crystal layer by the adhesive layer.

13. The device of claim 1, wherein the nanocapsule liquid crystal layer includes a plurality of nano-sized capsules, each of which includes a plurality of liquid crystal molecules therein, dispersed in a buffer layer.

14. The device of claim 13, wherein a diameter of each nano-sized capsule is about 1 nm to about 320 nm.

15. The device of claim 13, wherein a volume of the nano-sized capsule is about 25% to about 65% of a volume of the nanocapsule liquid crystal layer.

16. The device of claim 13, wherein a refractive index difference between the nematic liquid crystal molecule and the nano-sized capsule is about ±0.1.

17. The device of claim 1, wherein the nanocapsule liquid crystal layer is formed by a curing process such that a vertical diameter of the nanocapsule is smaller than a horizontal diameter of the nanocapsule.

18. The device of claim 1, wherein the liquid crystal panel further includes:
    gate and data lines on the substrate and crossing each other to define a pixel region; and
    a thin film transistor in the pixel region and connected to the gate and data lines,
    wherein the pixel electrode in the pixel region is connected to the thin film transistor.

19. The device of claim 1, wherein the nanocapsule liquid crystal layer contacts the pixel and common electrodes.

20. The device of claim 1, further comprising: a backlight unit located below the first polarizing plate and including a light source.

* * * * *